(12) United States Patent
Tardif et al.

(10) Patent No.: US 11,578,600 B1
(45) Date of Patent: Feb. 14, 2023

(54) TURBINE BLADE AIRFOIL PROFILE

(71) Applicant: PRATT & WHITNEY CANADA CORP., Longueuil (CA)

(72) Inventors: Marc Tardif, Candiac (CA); Francois Roy, St-Bruno-de-Montarville (CA); Jonathan Dorai, Chambly (CA); Mohammed Ennacer, St-Hubert (CA); Benjamin Luymes, Kingston (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/451,018

(22) Filed: Oct. 15, 2021

(51) Int. Cl.
*F01D 5/14* (2006.01)
*F02C 3/04* (2006.01)

(52) U.S. Cl.
CPC ................ *F01D 5/141* (2013.01); *F02C 3/04* (2013.01); *F05D 2220/32* (2013.01); *F05D 2240/30* (2013.01)

(58) Field of Classification Search
CPC ........................................................ F01D 5/141
See application file for complete search history.

(56) References Cited

U.S. PATENT DOCUMENTS

| | | | |
|---|---|---|---|
| 6,398,489 B1 | 6/2002 | Burdgick et al. | |
| 6,832,897 B2 | 12/2004 | Urban | |
| 6,854,961 B2 | 2/2005 | Zhang et al. | |
| 6,910,868 B2 | 6/2005 | Hyde et al. | |
| 7,306,436 B2 | 12/2007 | Girgis et al. | |
| 7,351,038 B2 | 4/2008 | Girgis et al. | |
| 7,354,249 B2 | 4/2008 | Girgis et al. | |
| 7,367,779 B2 | 5/2008 | Girgis et al. | |
| 7,402,026 B2 | 7/2008 | Girgis et al. | |
| 7,520,726 B2 | 4/2009 | Papple et al. | |
| 7,520,727 B2 | 4/2009 | Sreekanth et al. | |
| 7,520,728 B2 | 4/2009 | Sleiman et al. | |
| 7,534,091 B2 | 5/2009 | Ravanis et al. | |
| 7,537,432 B2 | 5/2009 | Marini et al. | |
| 7,537,433 B2 | 5/2009 | Girgis et al. | |
| 7,559,746 B2 | 7/2009 | Tsifourdaris et al. | |
| 7,559,747 B2 | 7/2009 | Mohan et al. | |
| 7,559,748 B2 | 7/2009 | Kidikian et al. | |
| 7,559,749 B2 | 7/2009 | Kidikian et al. | |
| 7,566,200 B2 | 7/2009 | Marini et al. | |
| 7,568,889 B2 | 8/2009 | Mohan et al. | |
| 7,568,890 B2 | 8/2009 | Findlay et al. | |
| 7,568,891 B2 | 8/2009 | Mohan et al. | |
| 7,611,326 B2 | 11/2009 | Trindade et al. | |
| 7,625,182 B2 | 12/2009 | Mah et al. | |
| 7,625,183 B2 | 12/2009 | Tsifourdaris et al. | |
| 7,632,074 B2 | 12/2009 | Ravanis et al. | |
| 8,100,659 B2 | 1/2012 | Marini | |

(Continued)

*Primary Examiner* — Igor Kershteyn
*Assistant Examiner* — John S Hunter, Jr.
(74) *Attorney, Agent, or Firm* — Norton Rose Fulbright Canada LLP.

(57) ABSTRACT

A turbine blade for a gas turbine engine has an airfoil including leading and trailing edges joined by spaced-apart pressure and suction sides to provide an exterior airfoil surface extending from a platform in a spanwise direction to a tip. The external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by a local axial chord, and a span location.

17 Claims, 5 Drawing Sheets

(56) References Cited

U.S. PATENT DOCUMENTS

| | | |
|---|---|---|
| 8,105,043 B2 | 1/2012 | Tsifourdaris |
| 8,105,044 B2 | 1/2012 | Marini et al. |
| 2005/0079061 A1 | 4/2005 | Beddard |
| 2008/0124219 A1 | 5/2008 | Kidikian et al. |
| 2009/0097982 A1 | 4/2009 | Saindon et al. |
| 2009/0116967 A1 | 5/2009 | Sleiman et al. |
| 2010/0008784 A1 | 1/2010 | Shafique et al. |
| 2011/0229317 A1 | 9/2011 | Marini |
| 2011/0236214 A1 | 9/2011 | Tsifourdaris |
| 2011/0243747 A1 | 10/2011 | Marini |
| 2011/0243748 A1 | 10/2011 | Tsifourdaris |
| 2011/0262279 A1 | 10/2011 | Marini |
| 2016/0115797 A1 | 4/2016 | Calla |
| 2020/0232328 A1 | 7/2020 | Song |

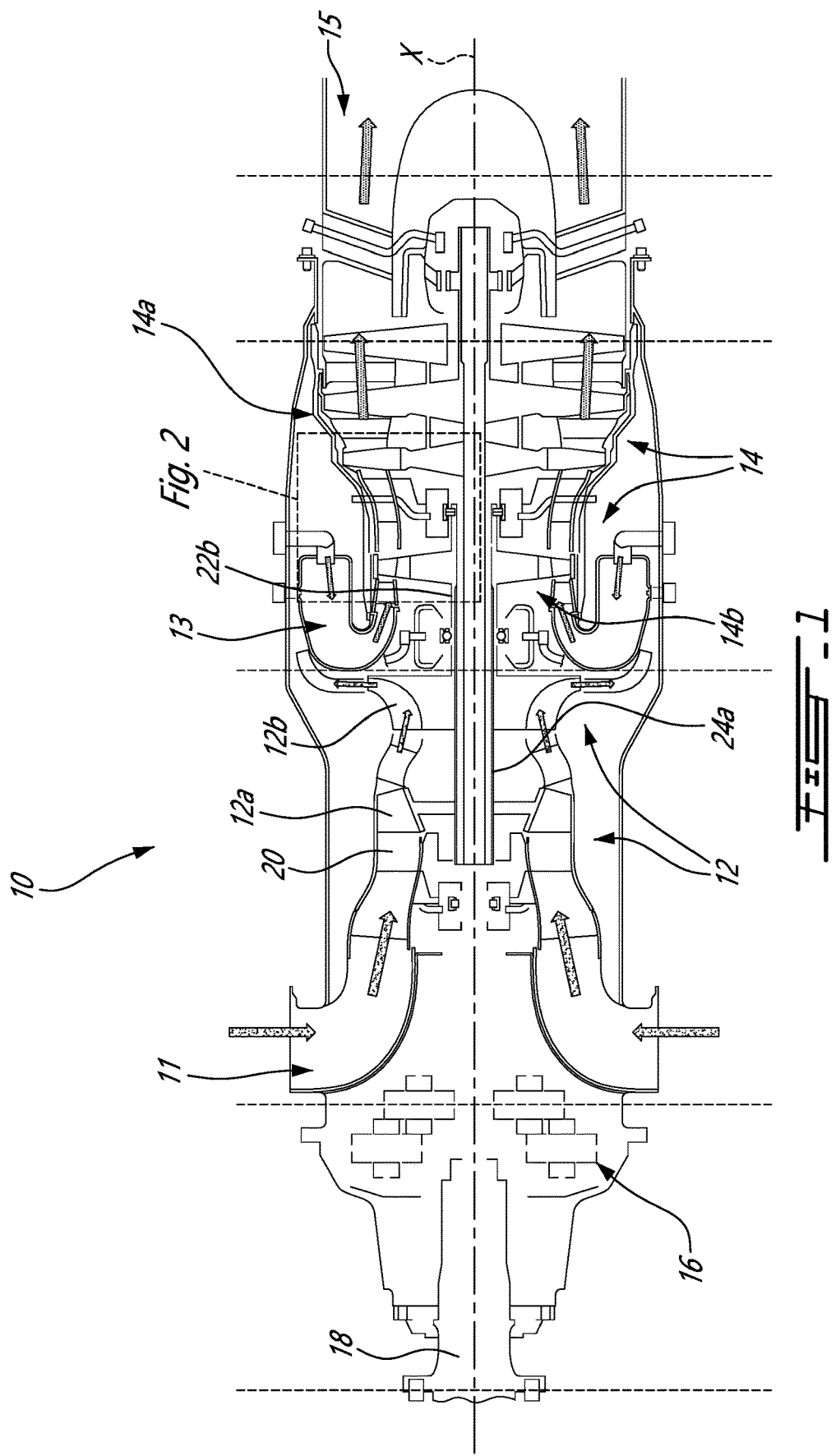

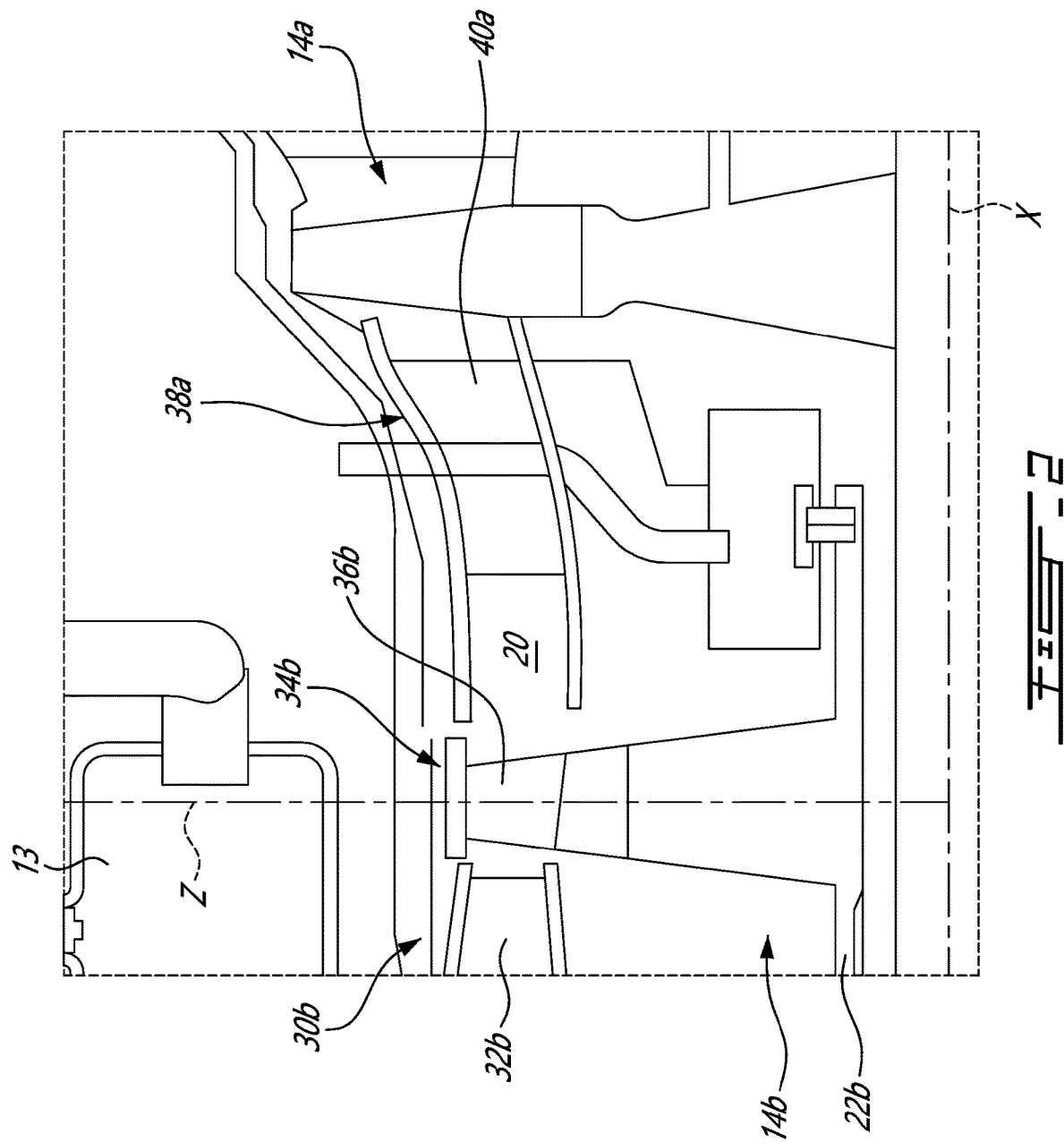

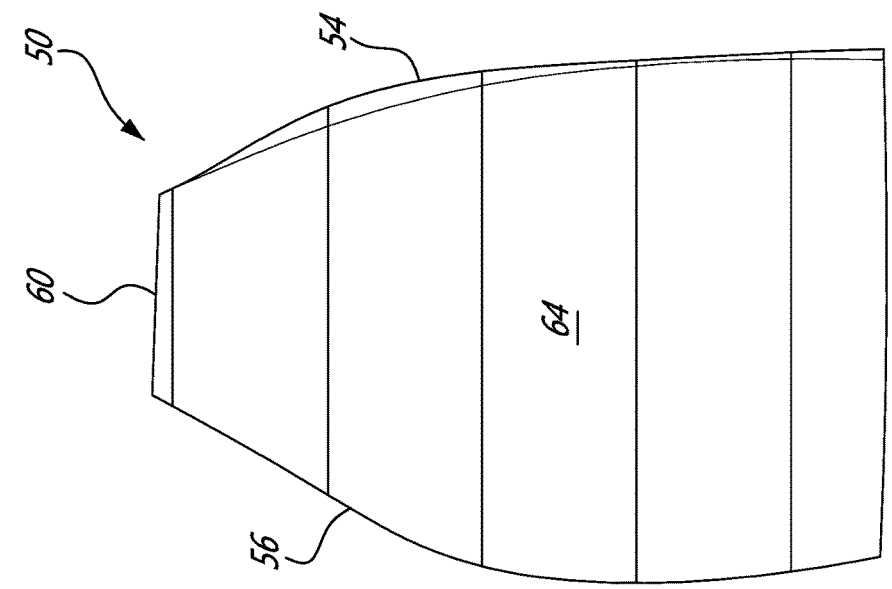
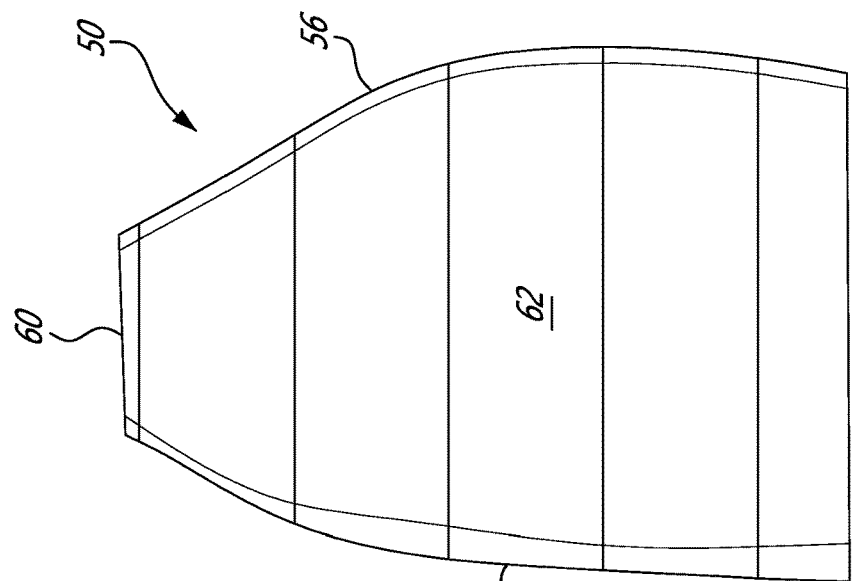
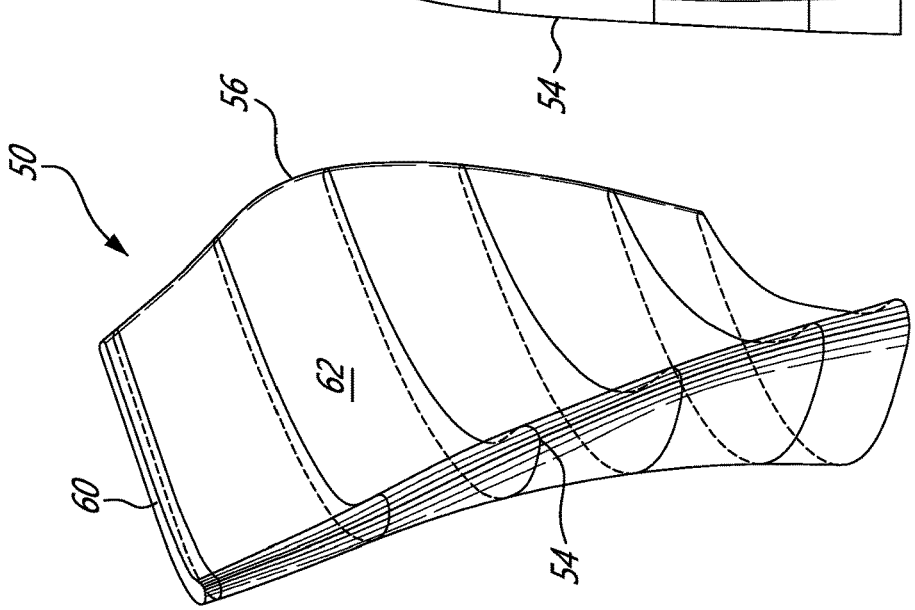

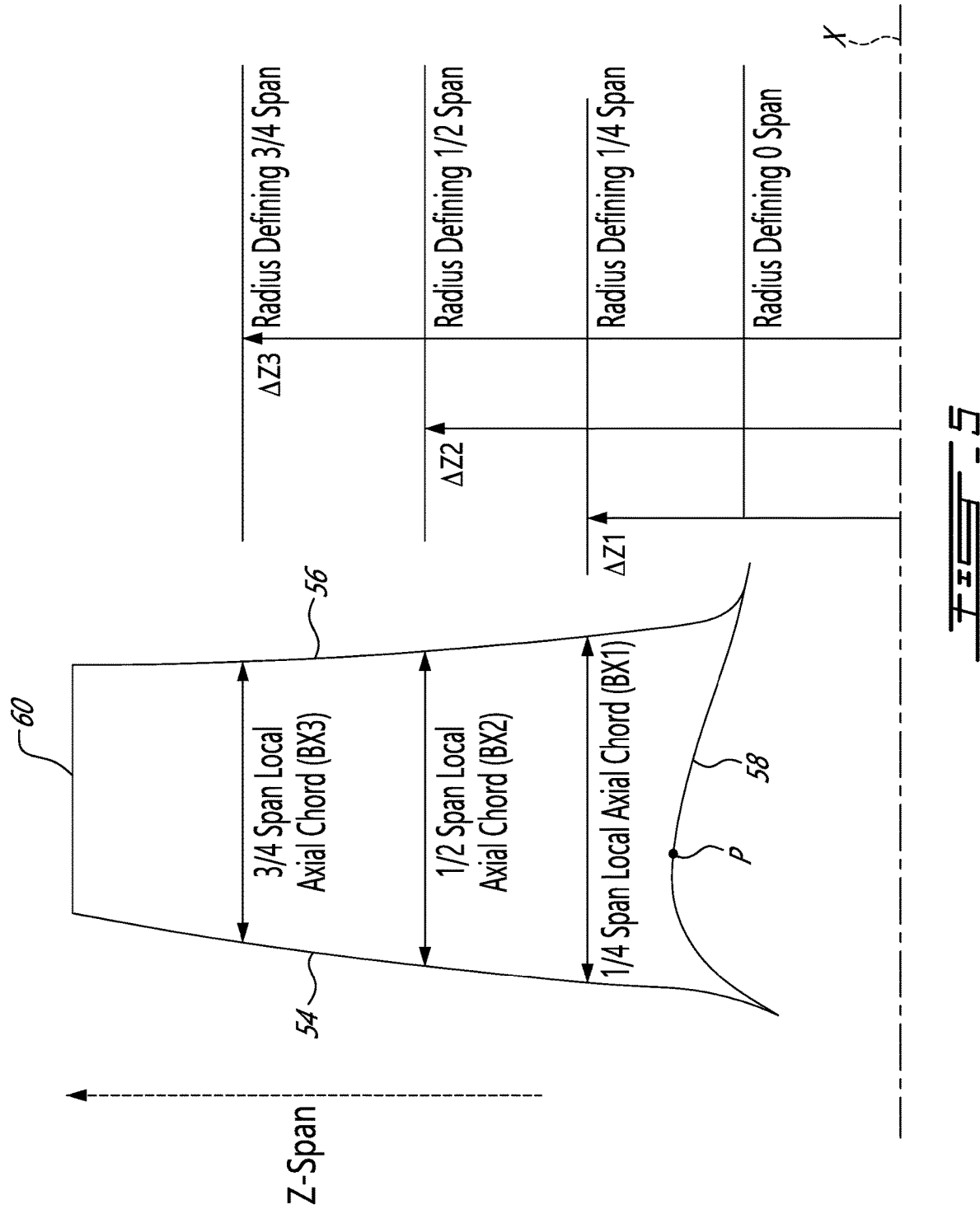

TURBINE BLADE AIRFOIL PROFILE

TECHNICAL FIELD

The disclosure relates generally to gas turbine engines and, more particularly, to an airfoil that may be incorporated into a gas turbine engine.

BACKGROUND OF THE ART

Every compressor and turbine stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. Each airfoil is subject to flow regimes which lend themselves easily to flow separation, which tend to limit the amount of work transferred to the compressor, and hence the total power capability of the engine. Turbine blades are also subject to harsh temperatures and pressures, which require a solid balance between aerodynamic and structural optimization. Therefore, improvements in airfoil design are sought.

SUMMARY

In one aspect, there is provided a turbine blade for a gas turbine engine, the turbine blade comprising an airfoil including a leading and a trailing edge joined by a pressure and a suction side to provide an exterior airfoil surface extending from a platform in a spanwise direction to a tip. The external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

In another aspect, there is provided a gas turbine engine comprising a high pressure turbine. The high pressure turbine is configured to drive a high pressure compressor. The high pressure turbine comprises a first stage array of turbine blades, wherein at least one of the turbine blades of the first stage array comprises an airfoil having leading and trailing edges joined by spaced-apart pressure and suction sides to provide an exterior airfoil surface extending from a platform in a span direction to a tip. The external airfoil surface is formed in substantial conformance with multiple cross-section profiles of the airfoil described by a set of Cartesian coordinates set forth in Table 1. The Cartesian coordinates are provided by an axial coordinate scaled by a local axial chord, a circumferential coordinate scaled by the local axial chord, and a span location, wherein the local axial chord corresponds to a width of the airfoil between the leading and trailing edges at the span location.

In a further aspect, there is provided a first-stage high pressure turbine blade comprising: a platform and an airfoil extending in a spanwise direction from the platform to a tip. The airfoil has an external airfoil surface formed in substantial conformance with multiple cross-section airfoil profiles described by a set of Cartesian coordinates set forth in Table 1.

DESCRIPTION OF THE DRAWINGS

Reference is now made to the accompanying figures in which:

FIG. 1 is a schematic cross-section view of a gas turbine engine;

FIG. 2 is a cross-section side view of a high pressure (HP) turbine section of the gas turbine engine;

FIG. 4a is an isometric view of an exemplary HP turbine airfoil corresponding to the directional references of FIG. 3b;

FIG. 4b is a pressure side view of the exemplary HP turbine airfoil shown in FIG. 4a;

FIG. 4c is a suction side view of the exemplary HP turbine airfoil shown in FIG. 4a; and FIG. 5 depicts the span positions and local axial chords reference in Table 1.

DETAILED DESCRIPTION

Figure 3A:
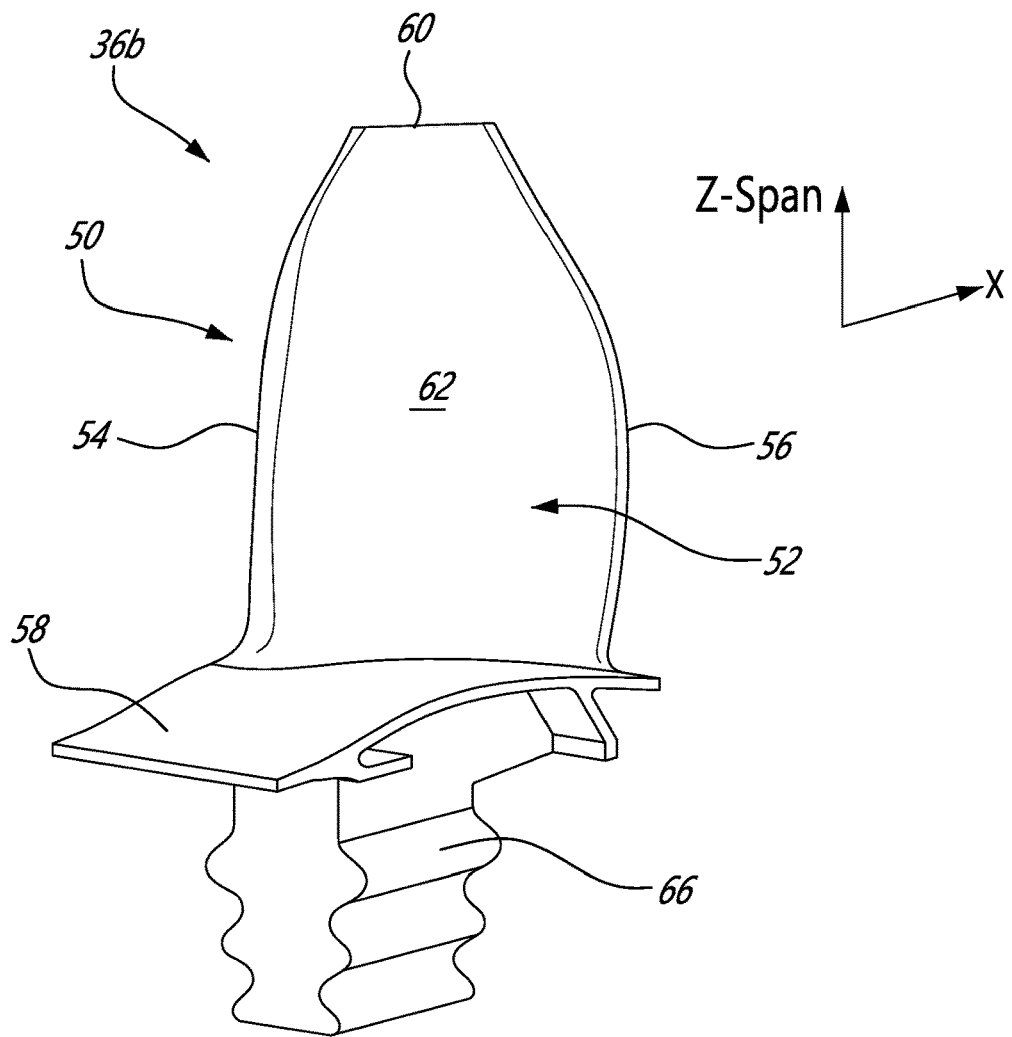
FIG. 3a is an isometric view of a first stage HP turbine blade.

FIG. 1 illustrates an example of a two-spool gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. According to the illustrated exemplary engine, the turbine 14 is drivingly connected to an input end of a reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. Still according to the illustrated embodiment, all the compressor and the turbine rotors are mounted in-line for rotation about the engine centerline X. However, it is understood that the turbine and compressor rotors could have different rotation axes. Also, it is understood that the concepts described herein are not limited to use with two-spool turboprop or turboshaft engines as the teachings may be applied to other types of turbine engines including various multi-spool engine architectures.

The exemplified engine 10 has an axially extending central core which defines an annular gaspath 20 through which gases flow, as depicted by flow arrows in FIG. 1. The exemplary embodiment shown in FIG. 1 is a "through flow" engine because gases flow through the gaspath 20 from the air inlet 11 at a front portion of the engine 10, to the exhaust 15 at a rear portion thereof. However, it is understood that the engine 10 could adopt different configurations, including a reverse flow configuration, the engine configuration illustrated in FIG. 1 being provided for illustrative purposes only.

The terms "upstream" and "downstream" used herein refer to the direction of an air/gas flow passing through the gaspath 20 of the engine 10. It should also be noted that the terms "axial", "radial", "angular" and "circumferential" are used with respect to the rotation axes of the turbine and compressor rotors (i.e. the engine centerline X in the exemplary engine).

According to the illustrated embodiment, the turbine 14 comprises a low pressure (LP) turbine 14a and a high pressure (HP) turbine 14b. The HP turbine 14b is drivingly connected to an HP compressor 12b via an HP shaft 22b. The HP turbine 14b, the HP shaft 22b and the HP compressor 12b form one of the two spools of the engine 10, namely the HP spool. According to the illustrated embodiment, the HP turbine 14b and the HP compressor 12b each have a single stage of rotating blades. However, it is understood that the HP turbine 14b and the HP compressor 12b could have any suitable number of stages.

Still according to the illustrated embodiment, the LP turbine 14a is drivingly connected to an LP compressor 12a via an LP shaft 24a. The LP turbine 14a, the LP shaft 24a and the LP compressor 12a form the other one of the two spools of the engine 10, namely the LP spool. The HP spool and the LP spool are independently rotatable. According to the illustrated embodiment, the LP turbine 14a has three stages of turbine blades, whereas the LP compressor 12a has a single stage of LP compressor blades. However, it is understood that the LP turbine 14a and the LP compressor 12a could have any suitable number of stages.

The LP shaft 24a is drivingly connected to the input end of the RBG 16 to drive the output shaft 18. Accordingly, the LP turbine 14a (also known as the power turbine) can be used to drive both the LP compressor 12a and the output shaft 18. An additional gearbox or the like (not shown) can be provided between the LP compressor 12a and the LP turbine 14a to allow the LP compressor 12a to rotate at a different speed from the LP turbine 14a.

In use, the air flowing through the inlet 11 is compressed by the LP compressor 12a then the HP compressor 12b, mixed and burned with fuel in the combustor 13, then expanded over the HP turbine 14b and the LP turbine 14a before being discharged through the exhaust 15. The HP turbine 14b drives the HP compressor 12b, whereas the LP turbine 14a drives the LP compressor 12a and the output shaft 18.

Referring to FIG. 2, it can be appreciated that the HP turbine 14b comprises series of rotating blades and stationary vanes that extends into the gaspath 20 of the engine 10. In the illustrated example, the HP turbine 14b has a single stage including a first array 30b of circumferentially spaced-apart stationary vanes 32b disposed at the outlet of the combustor 13 for directing the combustion gases to a first stage array 34b of circumferentially spaced-apart HP turbine blades 36b disposed axially between the first array 30b of HP turbine vanes 32b and the first stage array 38a of LP turbine vanes 40a. The first stage HP turbine blades 36b are mounted in position along a stacking line corresponding to axis Z in FIG. 2. The stacking line defines the axial location (x) where the blades are mounted along the centerline of the engine 10.

Figure 3B:
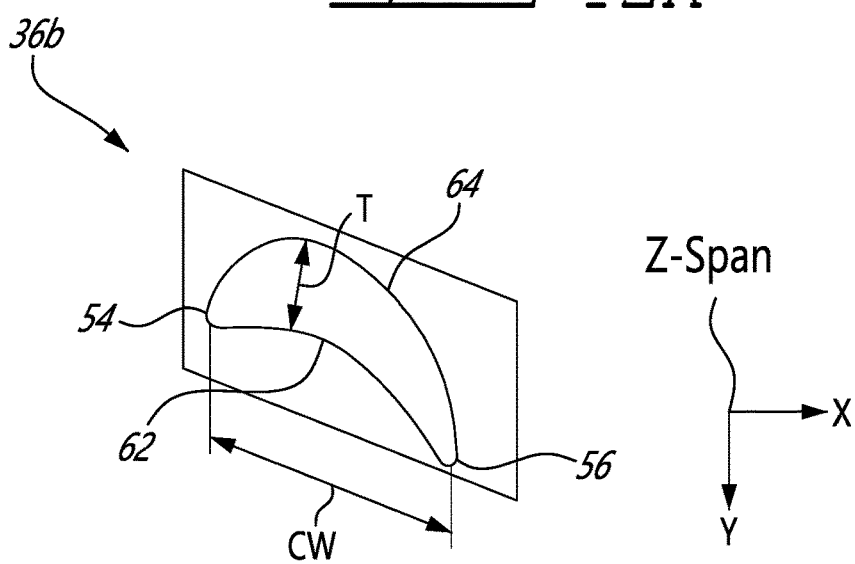
FIG. 3b is a plan, top view of the turbine blade of FIG. 3a illustrating directional references.

FIGS. 3a and 3b schematically illustrate an example of one of the HP turbine blades 36b of the first stage array 34b. It can be seen that the first/single stage HP turbine blade 36b includes an airfoil 50 having an exterior surface 52 extending in a chordwise direction CW between a leading edge 54 and a trailing edge 56 and in a spanwise direction Z from a platform 58 to a tip 60. The airfoil 50 is provided between pressure and suction sides 62, 64 in an airfoil thickness direction T. A root 66 depends radially inwardly from the platform 58 for detachably mounting the blade 36b to a rotor disk. It is however understood that the turbine blade could be integrally formed with the disk. In such a configuration, the root is eliminated and the platform is provided at the outer diameter of the rotor disk.

The exterior surface 52 of the airfoil 50 generates lift based upon its geometry and direct flow along the gaspath 20. Various views of the airfoil 50 of the first stage HP turbine blade are shown in FIGS. 4a-4c. In one example, the first-stage array 34b consists of twenty-seven (27) turbine blades 36b, but the number may vary according to engine size. The turbine blades can be constructed from a high-strength, heat-resistant material such as a nickel-based or cobalt-based superalloy, or of a high-temperature, stress-resistant ceramic or composite material, for example. In cooled configurations, internal fluid passages and external cooling apertures provide for a combination of impingement and film cooling. In addition, one or more thermal barrier coatings (TBC), abrasion-resistant coatings, and/or other protective coatings may be applied to the turbine blade.

Referring to FIG. 5, the geometries of external surfaces of airfoil are described in terms of Cartesian coordinates defined along x, y, and z axes, which respectively correspond to the axial (x), circumferential/tangential (y), and span/radial (Z-span) (z) directions shown in FIGS. 3a and 3b. The span coordinate is provided as a radial distance ($\Delta$ZI-$\Delta$Z3) from the rotation axis X of the airfoil. The "0" span is taken at a point P where the airfoil meets the platform 58, as schematically illustrated in FIG. 5. The overall or full span is 100% the distance from the point P to the tip 60 in the span direction Z-span. By way of example, the "¼ span" ($\Delta$Z1) is 25% the distance from the point P toward the tip 60 in the span direction Z-span. As best shown in FIG. 2, the X axis extends axially along the rotation axis of the turbine airfoil 50. The positive X direction is axially towards the aft of the turbine engine 10. The Y axis (FIG. 3b) extends tangentially with the positive Y direction being in the direction of rotation of the airfoil 50.

The axial (x) and circumferential (y) coordinates are normalized by the local axial chord (Bx) for the (3) given span location (Bx1-Bx3). By way of example, local axial chord (Bx1) for axial (x) and circumferential (y) coordinates associated with the ¼ span ($\Delta$ZI) corresponds to the width of the airfoil between the leading and trailing edges 54, 56 at the ¼ span location ($\Delta$ZI).

The contour of the airfoil is set forth in Table 1, which provides the axial (x) and circumferential (y) coordinates (in inches) scaled by the local axial chord (Bx) for given span locations or positions. 3-D airfoil surfaces are formed by joining adjacent points in Table I in a smooth manner and joining adjacent sections or sectional profiles along the span. The manufacturing tolerance relative to the specified coordinates is ±0.050 inches (±1.27 mm). The coordinates define points on a cold, uncoated, stationary airfoil surface at nominal restagger, in a plane at the corresponding span positions. Additional elements such as cooling holes, protective coatings, fillets, and seal structures may also be formed onto the specified airfoil surface, or onto an adjacent platform surface, but these elements are not necessarily described by the normalized coordinates. For example, a variable coating may be applied between 0.0001 inches (0.003 mm) (trace) and 0.01 inches (0.28 mm) thick. According to one particular embodiment, a constant coating of 0.0015 (0.0381 mm) inches is applied.

TABLE 1

| REFERENCE RADIUS: Z1 SECTION COORDINATES (X,Y)/BX1 | |
| --- | --- |
| 0.000 | 0.016 |
| 0.002 | 0.028 |
| 0.005 | 0.038 |
| 0.012 | 0.051 |

TABLE 1-continued

| | |
|---|---|
| 0.021 | 0.063 |
| 0.032 | 0.076 |
| 0.043 | 0.087 |
| 0.055 | 0.100 |
| 0.075 | 0.116 |
| 0.100 | 0.133 |
| 0.125 | 0.146 |
| 0.150 | 0.157 |
| 0.175 | 0.166 |
| 0.200 | 0.173 |
| 0.225 | 0.177 |
| 0.250 | 0.179 |
| 0.275 | 0.179 |
| 0.300 | 0.178 |
| 0.325 | 0.176 |
| 0.350 | 0.172 |
| 0.375 | 0.166 |
| 0.400 | 0.159 |
| 0.425 | 0.151 |
| 0.450 | 0.141 |
| 0.475 | 0.130 |
| 0.500 | 0.117 |
| 0.525 | 0.102 |
| 0.550 | 0.086 |
| 0.575 | 0.069 |
| 0.600 | 0.051 |
| 0.625 | 0.031 |
| 0.650 | 0.010 |
| 0.675 | −0.013 |
| 0.700 | −0.037 |
| 0.725 | −0.062 |
| 0.750 | −0.088 |
| 0.775 | −0.116 |
| 0.800 | −0.145 |
| 0.825 | −0.176 |
| 0.850 | −0.208 |
| 0.875 | −0.241 |
| 0.900 | −0.276 |
| 0.925 | −0.312 |
| 0.943 | −0.338 |
| 0.959 | −0.360 |
| 0.972 | −0.379 |
| 0.982 | −0.394 |
| 0.988 | −0.404 |
| 0.993 | −0.412 |
| 0.997 | −0.418 |
| 0.999 | −0.423 |
| 1.000 | −0.428 |
| 0.999 | −0.434 |
| 0.997 | −0.438 |
| 0.993 | −0.442 |
| 0.988 | −0.444 |
| 0.982 | −0.444 |
| 0.972 | −0.438 |
| 0.959 | −0.420 |
| 0.943 | −0.398 |
| 0.925 | −0.373 |
| 0.900 | −0.340 |
| 0.875 | −0.310 |
| 0.850 | −0.282 |
| 0.825 | −0.256 |
| 0.800 | −0.231 |
| 0.775 | −0.208 |
| 0.750 | −0.186 |
| 0.725 | −0.165 |
| 0.700 | −0.145 |
| 0.675 | −0.127 |
| 0.650 | −0.110 |
| 0.625 | −0.094 |
| 0.600 | −0.078 |
| 0.575 | −0.064 |
| 0.550 | −0.051 |
| 0.525 | −0.038 |
| 0.500 | −0.027 |
| 0.475 | −0.017 |
| 0.450 | −0.008 |
| 0.425 | −0.001 |
| 0.400 | 0.006 |
| 0.375 | 0.011 |
| 0.350 | 0.016 |
| 0.325 | 0.019 |
| 0.300 | 0.021 |
| 0.275 | 0.021 |
| 0.250 | 0.021 |
| 0.225 | 0.020 |
| 0.200 | 0.018 |
| 0.175 | 0.014 |
| 0.150 | 0.010 |
| 0.125 | 0.005 |
| 0.100 | −0.001 |
| 0.075 | −0.007 |
| 0.055 | −0.012 |
| 0.043 | −0.014 |
| 0.032 | −0.014 |
| 0.021 | −0.012 |
| 0.012 | −0.007 |
| 0.005 | −0.001 |
| 0.002 | 0.007 |

REFERENCE RADIUS: Z2
SECTION COORDINATES (X,Y)/BX2

| | |
|---|---|
| 0.000 | 0.111 |
| 0.002 | 0.124 |
| 0.005 | 0.134 |
| 0.012 | 0.147 |
| 0.021 | 0.158 |
| 0.032 | 0.168 |
| 0.043 | 0.176 |
| 0.055 | 0.185 |
| 0.075 | 0.195 |
| 0.100 | 0.204 |
| 0.125 | 0.211 |
| 0.150 | 0.216 |
| 0.175 | 0.218 |
| 0.200 | 0.219 |
| 0.225 | 0.218 |
| 0.250 | 0.216 |
| 0.275 | 0.212 |
| 0.300 | 0.206 |
| 0.325 | 0.199 |
| 0.350 | 0.191 |
| 0.375 | 0.181 |
| 0.400 | 0.170 |
| 0.425 | 0.157 |
| 0.450 | 0.143 |
| 0.475 | 0.127 |
| 0.500 | 0.111 |
| 0.525 | 0.093 |
| 0.550 | 0.074 |
| 0.575 | 0.053 |
| 0.600 | 0.032 |
| 0.625 | 0.009 |
| 0.650 | −0.015 |
| 0.675 | −0.040 |
| 0.700 | −0.066 |
| 0.725 | −0.093 |
| 0.750 | −0.121 |
| 0.775 | −0.150 |
| 0.800 | −0.181 |
| 0.825 | −0.213 |
| 0.850 | −0.245 |
| 0.875 | −0.279 |
| 0.900 | −0.315 |
| 0.925 | −0.351 |
| 0.943 | −0.377 |
| 0.959 | −0.399 |
| 0.972 | −0.418 |
| 0.982 | −0.433 |
| 0.988 | −0.442 |
| 0.993 | −0.450 |
| 0.997 | −0.456 |
| 0.999 | −0.460 |
| 1.000 | −0.465 |
| 0.999 | −0.471 |
| 0.997 | −0.476 |
| 0.993 | −0.480 |
| 0.988 | −0.482 |
| 0.982 | −0.483 |
| 0.972 | −0.478 |

TABLE 1-continued

| | |
|---|---|
| 0.959 | −0.461 |
| 0.943 | −0.439 |
| 0.925 | −0.414 |
| 0.900 | −0.379 |
| 0.875 | −0.346 |
| 0.850 | −0.314 |
| 0.825 | −0.283 |
| 0.800 | −0.253 |
| 0.775 | −0.224 |
| 0.750 | −0.196 |
| 0.725 | −0.168 |
| 0.700 | −0.142 |
| 0.675 | −0.117 |
| 0.650 | −0.093 |
| 0.625 | −0.071 |
| 0.600 | −0.050 |
| 0.575 | −0.031 |
| 0.550 | −0.013 |
| 0.525 | 0.004 |
| 0.500 | 0.020 |
| 0.475 | 0.034 |
| 0.450 | 0.048 |
| 0.425 | 0.060 |
| 0.400 | 0.071 |
| 0.375 | 0.080 |
| 0.350 | 0.089 |
| 0.325 | 0.095 |
| 0.300 | 0.100 |
| 0.275 | 0.103 |
| 0.250 | 0.104 |
| 0.225 | 0.103 |
| 0.200 | 0.101 |
| 0.175 | 0.098 |
| 0.150 | 0.094 |
| 0.125 | 0.089 |
| 0.100 | 0.084 |
| 0.075 | 0.079 |
| 0.055 | 0.077 |
| 0.043 | 0.077 |
| 0.032 | 0.079 |
| 0.021 | 0.083 |
| 0.012 | 0.089 |
| 0.005 | 0.097 |
| 0.002 | 0.105 |

| REFERENCE RADIUS: Z3 SECTION COORDINATES (X,Y)/BX3 | |
|---|---|
| 0.000 | 0.290 |
| 0.002 | 0.301 |
| 0.005 | 0.310 |
| 0.012 | 0.320 |
| 0.021 | 0.329 |
| 0.032 | 0.337 |
| 0.043 | 0.343 |
| 0.055 | 0.348 |
| 0.075 | 0.353 |
| 0.100 | 0.358 |
| 0.125 | 0.361 |
| 0.150 | 0.362 |
| 0.175 | 0.360 |
| 0.200 | 0.357 |
| 0.225 | 0.352 |
| 0.250 | 0.345 |
| 0.275 | 0.337 |
| 0.300 | 0.327 |
| 0.325 | 0.315 |
| 0.350 | 0.302 |
| 0.375 | 0.288 |
| 0.400 | 0.272 |
| 0.425 | 0.255 |
| 0.450 | 0.237 |
| 0.475 | 0.217 |
| 0.500 | 0.196 |
| 0.525 | 0.174 |
| 0.550 | 0.150 |
| 0.575 | 0.126 |
| 0.600 | 0.100 |
| 0.625 | 0.074 |
| 0.650 | 0.047 |

TABLE 1-continued

| | |
|---|---|
| 0.675 | 0.019 |
| 0.700 | −0.010 |
| 0.725 | −0.040 |
| 0.750 | −0.071 |
| 0.775 | −0.102 |
| 0.800 | −0.135 |
| 0.825 | −0.168 |
| 0.850 | −0.203 |
| 0.875 | −0.239 |
| 0.900 | −0.276 |
| 0.925 | −0.313 |
| 0.943 | −0.341 |
| 0.959 | −0.366 |
| 0.972 | −0.387 |
| 0.982 | −0.403 |
| 0.988 | −0.413 |
| 0.993 | −0.421 |
| 0.997 | −0.427 |
| 0.999 | −0.432 |
| 1.000 | −0.439 |
| 0.999 | −0.444 |
| 0.997 | −0.450 |
| 0.993 | −0.454 |
| 0.988 | −0.458 |
| 0.982 | −0.460 |
| 0.972 | −0.459 |
| 0.959 | −0.450 |
| 0.943 | −0.426 |
| 0.925 | −0.400 |
| 0.900 | −0.363 |
| 0.875 | −0.327 |
| 0.850 | −0.291 |
| 0.825 | −0.256 |
| 0.800 | −0.221 |
| 0.775 | −0.187 |
| 0.750 | −0.154 |
| 0.725 | −0.121 |
| 0.700 | −0.090 |
| 0.675 | −0.059 |
| 0.650 | −0.030 |
| 0.625 | −0.002 |
| 0.600 | 0.026 |
| 0.575 | 0.051 |
| 0.550 | 0.076 |
| 0.525 | 0.099 |
| 0.500 | 0.122 |
| 0.475 | 0.144 |
| 0.450 | 0.164 |
| 0.425 | 0.184 |
| 0.400 | 0.202 |
| 0.375 | 0.218 |
| 0.350 | 0.233 |
| 0.325 | 0.244 |
| 0.300 | 0.254 |
| 0.275 | 0.261 |
| 0.250 | 0.265 |
| 0.225 | 0.267 |
| 0.200 | 0.267 |
| 0.175 | 0.266 |
| 0.150 | 0.263 |
| 0.125 | 0.259 |
| 0.100 | 0.255 |
| 0.075 | 0.250 |
| 0.055 | 0.246 |
| 0.043 | 0.246 |
| 0.032 | 0.249 |
| 0.021 | 0.255 |
| 0.012 | 0.264 |
| 0.005 | 0.274 |
| 0.002 | 0.284 |

This set of points represents a novel and unique solution to the target design criteria mentioned herein above, and are well-adapted for use in the single-stage high pressure turbine blade array 34b of exemplified engine 10. According to at least some embodiments, the turbine airfoil profile is particularly configured to improve the service life of the first stage HP turbine blades 36b.

In general, the turbine blade airfoil 50, as described herein, has a combination of axial sweep and tangential lean. Depending on configuration, the lean and sweep angles sometimes vary by up to ±10° or more. In addition, the turbine blade is sometimes rotated with respect to a radial axis or a normal to the platform or shroud surface, for example, by up to ±10° or more.

Novel aspects of the turbine blade and associated airfoil surfaces described herein are achieved by substantial conformance to specified geometries. Substantial conformance generally includes or may include a manufacturing tolerance of about ±0.05 inches (±1.27 mm), in order to account for variations in molding, cutting, shaping, surface finishing and other manufacturing processes, and to accommodate variability in coating thicknesses. This tolerance is generally constant or not scalable, and applies to each of the specified blade surfaces, regardless of size.

Substantial conformance is based on sets of points representing a three-dimensional surface with particular physical dimensions, for example, in inches or millimeters, as determined by selecting particular values of the scaling parameters. A substantially conforming airfoil, blade or, or vane structure has surfaces that conform to the specified sets of points, within the specified tolerance.

Alternatively, substantial conformance is based on a determination by a national or international regulatory body, for example, in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade, or vane, or that the part or structure complies with airworthiness standards applicable to the specified blade, vane, or airfoil. In particular, substantial conformance encompasses any regulatory determination that a particular part or structure is sufficiently similar to, identical to, or the same as a specified blade, vane, or airfoil, such that certification or authorization for use is based at least in part on the determination of similarity.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the present disclosure includes several aspects and embodiments that include particular features. Although these particular features may be described individually, it is within the scope of the present disclosure that some or all of these features may be combined with any one of the aspects and remain within the scope of the present disclosure. Yet further modifications could be implemented by a person of ordinary skill in the art in view of the present disclosure, which modifications would be within the scope of the present technology.

The invention claimed is:

1. A turbine blade for a gas turbine engine, the turbine blade comprising:
    an airfoil having a leading edge and a trailing edge joined by a pressure side and a suction side to provide an exterior airfoil surface extending from a platform in a spanwise direction to a tip; and
    wherein the external airfoil surface is formed in conformance with multiple cross-section profiles of the airfoil described by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading edge and the trailing edge at the span location.

2. The turbine blade according to claim 1, wherein the airfoil is a high pressure turbine blade.

3. The turbine blade according to claim 1, wherein the airfoil is a first-stage high pressure turbine blade.

4. The turbine blade according to claim 1, wherein the span location corresponds to a distance from a rotation axis of the airfoil.

5. The turbine blade according to claim 1, wherein the Cartesian coordinates in Table 1 have a tolerance relative to the specified coordinates of ±0.050 inches (±1.27 mm).

6. The turbine blade according to claim 1, wherein the Cartesian coordinates define points on a cold, uncoated airfoil surface at nominal restagger, in a plane at the span location.

7. A first-stage high pressure turbine blade comprising:
    a platform; and
    an airfoil extending in a spanwise direction from the platform to a tip, the airfoil having an external airfoil surface formed in conformance with multiple cross-section airfoil profiles described by a set of Cartesian coordinates set forth in Table 1.

8. The first-stage high pressure turbine blade according to claim 7, wherein the Cartesian coordinates in Table 1 have Cartesian coordinate values for a cold uncoated condition at nominal restagger.

9. The first-stage high pressure turbine blade according to claim 7, wherein the Cartesian coordinates in Table 1 have a tolerance relative to the specified coordinates of ±0.050 inches (±1.27 mm).

10. A gas turbine engine comprising:
    a high pressure turbine configured to drive a high pressure compressor;
    wherein the high pressure turbine comprises a first stage array of turbine blades, wherein at least one of the turbine blades of the first stage array comprises an airfoil having leading and trailing edges joined by spaced-apart pressure and suction sides to provide an exterior airfoil surface extending from a platform in a span direction to a tip; and
    wherein the external airfoil surface is formed in conformance with multiple cross-section profiles of the airfoil described by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading edge and the trailing edge at the span location.

11. The gas turbine engine according to claim 10, wherein the span location corresponds to a distance from a rotation axis of the airfoil.

12. The gas turbine engine according to claim 10, wherein the Cartesian coordinates in Table 1 have a tolerance relative to the specified coordinates of ±0.050 inches (±1.27 mm).

13. The gas turbine engine according to claim 10, wherein the Cartesian coordinates define points on a cold, uncoated airfoil surface at nominal restagger, in a plane at the span location.

14. The gas turbine engine according to claim 10, wherein the high pressure turbine has a single stage of high pressure turbine blades.

15. The gas turbine engine according to claim 10, wherein the high pressure compressor has a single stage of compressor blades.

16. The gas turbine engine according to claim 10, wherein the first stage array of turbine blades of the high pressure turbine comprises 27 turbine airfoils.

17. The gas turbine engine according to claim 10, wherein the gas turbine engine has an output shaft connectable to a load.

\* \* \* \* \*